Dec. 7, 1954 W. LÖBBE 2,696,374
SHIFTING JACK FOR LONGWALL COAL PLANING MACHINES
Original Filed May 27, 1948 2 Sheets-Sheet 1
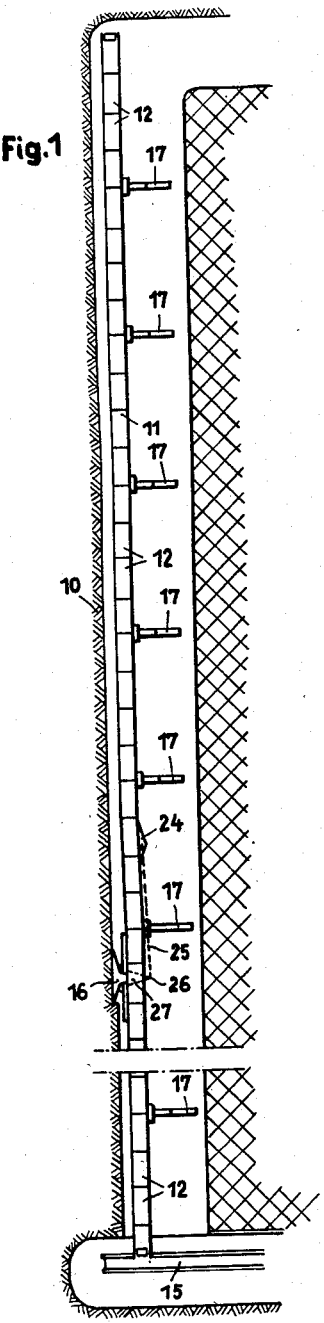
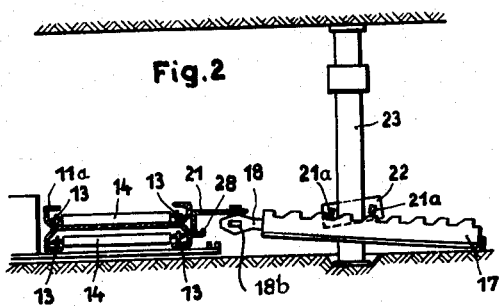
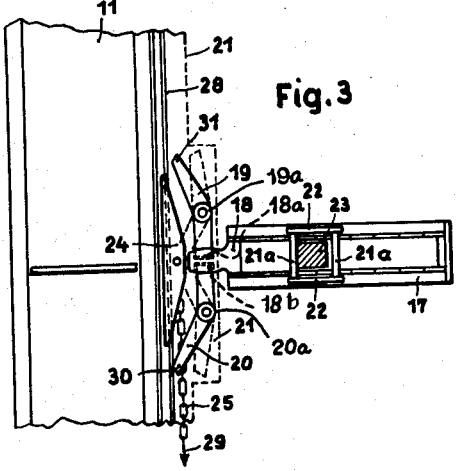
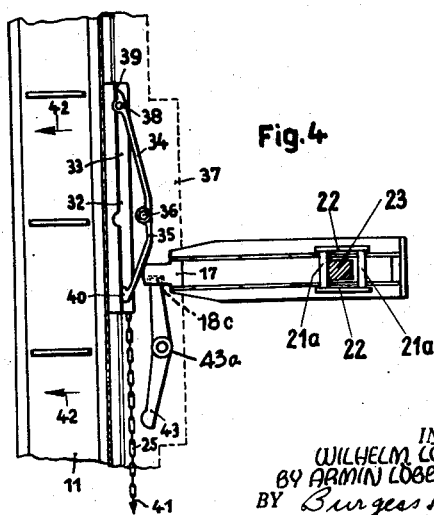
INVENTOR.
WILHELM LÖBBE, DECEASED,
BY ARMIN LÖBBE, ADMINISTRATOR
BY Burgess Dinklage
ATTORNEYS Dec. 7, 1954 W. LÖBBE 2,696,374
SHIFTING JACK FOR LONGWALL COAL PLANING MACHINES
Original Filed May 27, 1948 2 Sheets-Sheet 2
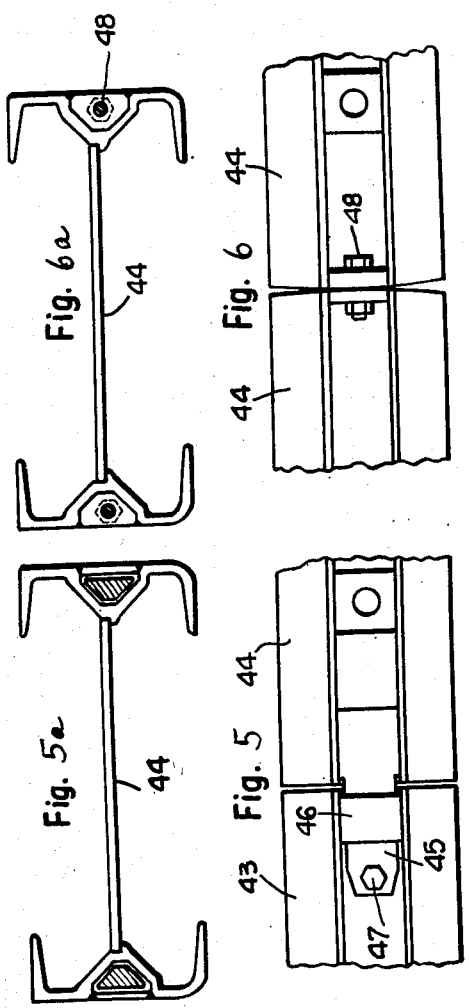
INVENTOR.
WILHELM LÖBBE, DECEASED,
BY ARMIN LÖBBE, ADMINISTRATOR
BY Burgess & Dinklage
ATTORNEYS

United States Patent Office 2,696,374
Patented Dec. 7, 1954

2,696,374

SHIFTING JACK FOR LONGWALL COAL PLANING MACHINES

Wilhelm Löbbe, deceased, late of Oberaden, Germany, by Armin Löbbe, administrator, Oberaden, Germany, assignor to Gewerkschaft Eisenhutte Westfalia (Lunen), Westphalia, Germany, a firm Original application May 27, 1948, Serial No. 29,484. Divided and this application May 9, 1950, Serial No. 160,834

Claims priority, application France July 2, 1947

13 Claims. (Cl. 262—8)

This invention relates to new and useful improvements in shifting jack for longwall coal planing machines.

One object of the invention is an improved shifting jack for a conveyor used in the long face or long wall mining of coal and preferably for a laterally flexible sectionally shiftable conveyor of this type.

The foregoing and further objects of the invention will be apparent from the following description read in conjunction with the drawings in which:

Fig. 1 is a plan view schematically illustrating a coal mining installation having a long face conveyor in position and showing the jacks and part shifting of the conveyor after the passage of the cutting means;

Fig. 2 illustrates parts of a cross section through a suitable conveyor and thereto attached jack member in accordance with the invention;

Fig. 3 is a top view partly in cross section of part of the construction shown in Fig. 2;

Fig. 4 represents a plan view of an alternative embodiment of a construction in accordance with the invention;

Fig. 5 is a cross-sectional view showing laterally flexible connections of adjacent sections;

Fig. 5a is an end view of one of the sections shown in Fig. 5;

Fig. 6 is a cross-sectional view of a substantially rigid connection between adjacent sections; and Fig. 6a illustrates an end view of one of the sections shown in Fig. 6.

The flexible trough to which the construction in accordance with this invention is applicable is described and claimed in the co-pending application, Serial Number 29,484, of which this application is a division.

Referring to the drawings, the conveyor 11 defines by means of the sections 12 the stationary trough 11a. The coal face is indicated at 10. A scraper flight conveyor comprising longitudinal chains 13 and cross bar scrapers 14 is situated within the conveying trough 11a. As shown in Fig. 2, the conveyor being of the endless type is returned underneath the bottom plate of the conveyor trough 11a. Conveyor 11 transfers the coal into the conveyor 15 situated in the adjacent gallery and which in turn will transport the coal to a further loading point. A coal cutter or planer 16 of the two-directional type is mounted for movement along the conveyor being suitably guided on the conveyor side facing the coal seam 10. As the planer 16 is placed into cutting position and then moved along the conveyor, it will break loose a portion of the side of the seam, and the coal cut in this manner will be loaded at the same time by the continuing movement of the planer or cutting head into the conveyor 11 in which it is continuously transported by the endlessly moving scraper bars. After the cutting head has reached a terminus position and is ready to be returned for a cutting in the reverse direction, it is necessary to shift the conveyor against the face 10 of the coal to again thereby have the same assume a distance for cutting position of the planer 16.

Within the preferred embodiment of the invention the shifting of the conveyor is accomplished automatically in sections after each section or series of sections has been passed by the planer so that when the same is ready to return the entire conveyor is already in position for another cut. Alternatively, the arrangement may be such that the conveyor is shifted after the planer 16 passes but is not shifted on the return stroke, the shifting being then accomplished on the movement of the planer in the first cutting direction by automatically shifting the conveyor in advance of the cutting head and again shifting it a further distance following the passage of the cutting head. In either case, the automatic arrangement within the preferred embodiment of the invention is such that the conveyor is automatically shifted to be at all times in guided coal cutting position for the planer 16. The shifting jack illustrated in accordance with the invention is preferably composed of a rack 17 preferably provided with one or two serrated side rails and having a jack head 18. As illustrated in Figs. 2 and 3, double arm levers 19 and 20 are mounted on supporting plate 21 secured to the conveyor 11. The opposing ends of levers 19 and 20 extend into openings 18a and 18b provided in the head portion 18 of the jack. These openings or slots accommodate the opposing arm ends in a substantially loose fitting manner so that upon actuation, the lever arms are able to move within the openings. The arms 19 and 20 are pivotably secured to the plate 21 by means of pivots 19a and 20a, respectively. Plate 21 is shown in dotted lines, and the structure underneath the plate in heavy lines, for the purpose of illustration. Two cross bars or pawls 21a preferably connected by the side bars 22 to form substantially a box around support column 23 are provided for cooperation with the teeth of the rack 17. If two cooperating pawls are provided they are preferably so arranged in successive alignment that they will have a distance from one another of half a rack tooth pitch or multiple thereof to thereby assure that regardless of the position, at least one pawl is always in ratchet engagement with the teeth of the serrated rails of the rack 17. The construction of the cross bars or pawls 21a is preferably such that they form cross bars of the frame connected by the side members 22 with preferably at least one of the pawls removable from the frame to permit disengagement of the frame from the supporting column 23. The shifting of the conveyor or of a conveyor section is actuated by the sliding wedge 24 which is hauled by means of a chain 25, secured at 26 in the base plate 27 in the planer 16. The base plate 27 passes underneath the entire width of the conveyor 11 so that wedge slide 24 travels and returns at the same speed as the planer 16 along the coal face 10. Slide 24 is guided on a rail 28 secured at the back side of the conveyor 11, i. e., the side away from the cutting side thereof. As is particularly illustrated in Fig. 3, the slide member 24 is wedge shaped towards both ends thereof. The travel and return in one and the other directions of the slide and therefore also of the coal planer 16 is substantially synchronized. In lieu of the particular construction here illustrated, some other structure may be used to this end. It is thus, for instance, possible, if desired, to couple temporarily the wedging slide 24 with the scraper flight conveyor 13, 14 while the planer is disconnected at the upper or lower end of the coal face 10.

In the practical operation of the invention with the wedging slide 24 (Fig. 3) assuming for instance a wedging position between the head portion 18 of the rack 17 and the side of the conveyor 11, the rack 17 is firmly held in anchored position by the pawl 21a engaging one of the teeth of the serrated side rails 17 and the outer face of the supporting column 23. Since the rack is thus prevented from moving backward, the wedging action of the slide 24 will cause the conveyor at that point to be shifted towards the coal face. Moving further in the direction of the arrow, slide 24 engages the free end of lever 20 and rotates the lever around its pivot into the position indicated in dotted outline. This in turn will move the head engaging arm of lever 20 inwardly, i. e., towards the conveyor side, thereby pulling rack 17 towards the conveyor, thus again placing the rack head 18 into wedging position. When then on the return movement of the wedging slide 24 together with the return movement of planer 16 the slide reaches the arm 20, it will at first pass underneath the free end 30 thereof. It will then, however, engage the jack head engaging end of the arm wedging itself between the same and the side of the conveyor thereby moving the conveyor again towards its cutting side. In the continued movement of wedge 24, it will engage the free arm 31 of the lever 19 pushing the same out and thereby again moving the rack 17 forward into wedging position for the jack head 18. Thus with each passing of the slide member 24 the conveyor will be shifted a predetermined small distance towards the coal face 10 at the point or area at which the jack member and the therewith cooperating mechanism is situated. A multiple number of jack members and therewith cooperating mechanism being provided suitably spaced apart along the length of the conveyor, the conveyor will be shifted section after section until, after the complete one way passage of the planing cutter 16, the entire conveyor has been shifted back into cutting position for the planer. If it is not desired to shift the conveyor in one shifting motion covering the entire distance of shift to place the same again into cutting position for the planer, it is possible to accomplish the shifting in stages as for instance by providing several wedging slides connected in series a short distance apart. As each slide passes the shifting mechanism, shifting will be accomplished for the distance controlled by the thickness of that slide and as the next trailing slide again passes the shifting arrangement, another shifting for the distance equivalent to that slide will result. Alternatively, if it is not desired to accomplish a shifting of the conveyor with each passage of the wedging slide, one of the levers 19 or 20 may be removed. In that case, the slide when moving in one direction will perform its wedging action and thus shift the conveyor while, when returning in the other direction, will merely replace the rack into wedging position for the cutting head without, at that time, shifting the conveyor. Proceeding in this manner may be for instance desirable when the coal seam is so high that more coal is cut after each shifting than can be conveniently transported by the conveyor. If, then, the conveyor is shifted laterally only every other passage of the wedge slide, the cutting tooth of the planer passes in one direction without being in coal cutting engagement and thus will not cut and transport coal onto the conveyor 11.

Referring to the illustration shown in Fig. 4, slide 32 comprises a base rail or bar 33 and a depressible spring pressure skid 34, 35. The two parts 34, 35 of the skid are joined by a link 36 and preferably a spring link tending to draw parts 34 and 35 towards each other. Part 34 of the skid is pivotably mounted at 38 on the base rail or bar 33 being supported by means of shoulder 39 acting as a stop to keep the skid arms 34, 35 in substantially spread position. The free end 40 of the skid part or arm 35 rests upon the base rail or bar 33 in slidable engagement therewith.

When moving slide 32 in the direction of the arrow 41, the slide is wedged between the conveyor side of conveyor 11 and the head portion 18 of the jack or rack 17 and the conveyor 11 is thereby shifted laterally in the direction of the arrows 42. Immediately upon completed wedging action, the slide 32 engages lever 43 rotating the same about its pivot 43a and thereby pulling rack 17 towards the conveyor and once more into wedging position. Lever 43 is pivotally mounted on plate 37 by means of pivot 43a, and the end of lever 43 extends in a loose-fitting manner into the opening 18c in the jack, so that upon actuation, the end of the lever is able to move within the opening. Plate 37 is shown in dotted lines, and the structure underneath the plate in heavy lines, for the purpose of illustration. When then the skid moves in the opposite direction, parts or arms 34 and 35 do not engage the jack head for wedging actuation thereof but collapse and lay themselves substantially against the base rail or bar 33, the slide 32 passing ineffectively the wedging head 18. In this manner, the wedge, when returning, does not shift the conveyor.

In order not to interfere with the proper operation of the scraper flight conveyor 13, the conveyor trough should be moved out of its longitudinal alignment only a relatively little distance at a time. This objective is for instance accomplished by arranging a multiple number of jack members such as rack 17 not at each section but at for instance each fourth section of the trough. This is for instance illustrated in Fig. 1, and the jack members are preferably positioned within the area of abutment of two adjacent sections leaving substantially four sections in between adjacent jack members. The lateral shifting or buckling of the trough will then take place only at these spots, particularly when using the preferred construction in accordance with the invention in which the trough sections in between adjacent jack members are connected substantially rigidly, i.e., substantially without lateral flexibility and only providing jack member abuting sections with laterally flexible links. This construction is for instance illustrated in Figs. 5 and 6. Figs. 5 and 5a show a construction of abutting sections with lateral flexibility. As there exemplified, the sections 43 and 44 are connected on both sides by a strap 45 and a bar 46. The reach of the straps 45, one on either trough side (only one trough side is illustrated) is limited by stop pins 47. On one side, the trough sections 43 and 44 can move in a direction tending to spread them apart, their movement being limited, however, when stop pin 47 meets bar 46. At the same time, the opposing abutting trough sections are buckled inwardly with the inner edges of the sections 43, 44 in abutting engagement. The connections for substantially rigidly securing trough sections in between laterally flexible sections are illustrated in Figs. 6 and 6a. As there shown, the trough sections 44 are connected by means of the bolts 48. A lateral buckling of the trough can then not take place at these joints. The connections, however, as will be readily seen, are such that buckling or slight displacement may take place in the vertical. This is of particular advantage in that it permits the trough to follow the depression and ridges of the seam or gallery floor. Though four sectional shiftability has been illustrated in connection with the drawings, it is also possible to vary this and make a lesser or larger number of sections laterally flexible with in-between rigid connections. Thus, for instance, it may be possible to so arrange the flexibility of the sections in a lateral direction that the conveyor may adapt itself to certain surface contours of the coal seam which to certain geological formations and well known conditions may not be always along a straight line but may proceed along a curved outline of the long wall. It is advisable to have the terminal cross sections and particularly those connected to driving stations substantially rigid and to independently shift these terminal portions such as by moving the driving mechanism to conform to substantially the all-over position of the conveyor from time to time.

What is claimed is:

1. Apparatus in a coal planing machine including a coal conveyor for automatically shifting the conveyor toward a coal face to be planed and for holding the conveyor in its shifted position comprising a wedging element defining a first wedging surface disposed on the back side of the conveyor opposite from the side on which the coal planing head of said planing machine is disposed, said wedging element being positioned for movement along the back of the conveyor, at least one jack member defining a second wedging surface, anchor means adapted to position said jack member for wedging contact with said first wedging surface at one point along the path of movement of said wedging element, to thereby shift at least a portion of the conveyor in the direction of the coal planing head, holding means positioned on said anchoring means for preventing movement of said jack member in a direction away from the conveyor and for allowing movement of the jack member in a direction toward the conveyor, at least one double armed lever fulcrumed in substantially fixed relation to the conveyor, one end of said lever coupled to a side of said jack member and the other end thereof positioned for contact with said first wedging surface after the said first surface made contact with said second wedging surface to thereby advance the jack member toward said conveyor.

2. Apparatus according to claim 1 in which said holding means consist of pawl means positioned on said anchor means and a ratchet defined by the body portion of said jack member.

3. Apparatus according to claim 1 in which said wedging element is mounted for movement along the conveyor with the coal planing head.

4. Apparatus according to claim 3 in which said wedging element is attached to the coal planing head by means of a flexible traction element.

5. Apparatus according to claim 1 including at least one additional double armed lever fulcrumed in substantially fixed relation to the conveyor with one end thereof coupled to the other side of said jack member for movement of the jack member toward said conveyor upon contact with the said first wedging surface of said wedging element after the said first surface made contact with said second wedging surface.

6. Apparatus according to claim 1 including a multiple number of said jack and anchoring means distributed along the conveyor and in which said wedging element is connected for movement with the cutting head to follow said head for wedging engagement and disengagement successively with each of said jacks.

7. Apparatus according to claim 6 in which said holding means is defined by pawl means on each said anchoring means and a ratchet defined by each jack member body portion.

8. Apparatus according to claim 1 in which said wedging element is composed of a base member movable along the conveyor, a convexly flexed spring member pivotally secured at one end to said base member and having its other end spring pressed against said base member in slidable contact therewith.

9. Apparatus for automatically shifting a coal planing machine of the type having a coal conveyor of the endless scraper type having a substantially laterally flexible trough and a coal planing head movable in either direction along side said conveyor, comprising a wedged shaped element mounted for movement alongside the conveyor in either direction and in substantially nonaligned relation to the coal planing head, a guide track on the conveyor defining a path of travel for the wedge which is disposed on the back side of the conveyor opposite from the side on which the coal planing head of said planing machine is disposed away from said coal planing head, a multiple number of jack members each defining ratchet, and pawl means, each jack member having a head portion on said ratchet defining a wedging surface positioned in spaced relation to said guide track for wedging action by said wedge element, each jack member having associated means for anchoring said pawl means against shifting force exerted on said head portion and having a double armed lever fulcrumed on the conveyor with one of its arms coupled to said head portion and movable therewith, the other arm dimensioned and positioned for wedging contact with said wedging element after contact of said wedging element with said head portion whereby each said jack member shifts its portion of the conveyor when contacted by said wedging element and is advanced to a new holding position for further wedging contact upon a subsequent contact of said wedging element with the free arm of said double arm lever.

10. Apparatus according to claim 9 in which said pawl means comprises two pawl members spaced apart for engagement one in one groove of the ratchet and the other in contact with one land of the ratchet.

11. Apparatus according to claim 9 in which each said jack member has two such double armed levers on said head portion one facing in each direction of planer head movement, in which said wedge element is a double wedge element for wedging action in each direction, whereby each jack member is advanced in the direction of said conveyor upon the movement of said wedging element in each direction.

12. Apparatus according to claim 11 in which said head portion is coupled to the arm of said levers for limited slidable movement relative thereto thereby permitting wedge shifting of said conveyor while said jack member remains anchored.

13. Apparatus according to claim 12 in which said pawl means comprises two pawl members spaced apart for engagement one in a groove and the other on a land of the ratchet.

References Cited in the file of this patent

UNITED STATES PATENTS

| Number | Name | Date |
|---|---|---|
| 1,517,095 | O'Toole | Nov. 25, 1924 |

OTHER REFERENCES

Bureau of Mines Information Circular #7377: Design and Operation of the Coal Planer, Ruhr Dist., Germany, by J. W. Buch, published October 1946, Fig. 17.